United States Patent
Kling

(10) Patent No.: US 7,676,654 B2
(45) Date of Patent: Mar. 9, 2010

(54) EXTENDED REGISTER SPACE APPARATUS AND METHODS FOR PROCESSORS

(75) Inventor: Ralph M Kling, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 252 days.

(21) Appl. No.: 11/830,473

(22) Filed: Jul. 30, 2007

(65) Prior Publication Data

US 2007/0266227 A1 Nov. 15, 2007

Related U.S. Application Data

(63) Continuation of application No. 10/238,276, filed on Sep. 10, 2002, now abandoned.

(51) Int. Cl.
*G06F 9/30* (2006.01)

(52) U.S. Cl. ........................ 712/210; 712/208

(58) Field of Classification Search ............... 712/208, 712/210, 230; 711/213, 214
See application file for complete search history.

(56) References Cited

U.S. PATENT DOCUMENTS

| | | | |
|---|---|---|---|
| 3,781,811 A * | 12/1973 | Yakata et al. ............ | 711/163 |
| 4,942,541 A | 7/1990 | Hoel et al. | |
| 5,142,634 A | 8/1992 | Fite et al. | |
| 5,301,285 A | 4/1994 | Hanawa et al. | |
| 5,303,356 A | 4/1994 | Vassiliadis et al. | |
| 5,420,984 A | 5/1995 | Good et al. | |
| 5,506,980 A | 4/1996 | Inagami et al. | |
| 5,590,326 A * | 12/1996 | Manabe ...................... | 711/150 |
| 5,625,276 A * | 4/1997 | Scott et al. ................... | 322/24 |
| 5,630,163 A | 5/1997 | Fung et al. | |
| 5,680,632 A | 10/1997 | Studor et al. | |
| 5,845,129 A * | 12/1998 | Wendorf et al. ............. | 710/200 |
| 5,845,331 A | 12/1998 | Carter et al. | |
| 5,881,217 A | 3/1999 | Ranson et al. | |
| 5,903,919 A * | 5/1999 | Myers ....................... | 711/220 |
| 6,014,739 A * | 1/2000 | Christie ..................... | 712/228 |
| 6,134,676 A | 10/2000 | VanHuben et al. | |
| 6,230,259 B1 * | 5/2001 | Christie et al. ............. | 712/228 |
| 7,085,889 B2 * | 8/2006 | Hammarlund et al. ...... | 711/130 |

OTHER PUBLICATIONS

Intel Corporation, "IA-32 Intel® Architecture Software Developer's Manual, vol. 1: Basic Architecture," pp. 63-68 (Chapter 3.7: Operand Addressing), Document No. 245470-012, 2003 (7 pages).

(Continued)

*Primary Examiner*—Aimee J Li
(74) *Attorney, Agent, or Firm*—Hanley, Flight and Zimmerman, LLC

(57) ABSTRACT

Methods and apparatus for accessing an extended register space associated with a processor are disclosed. In an example method, an instruction indicating a tag value is received. It is then determined whether information is stored in a first group of registers or a second group of registers based on a comparison of the tag value and an identifier value indicative of the second group of registers. The information is then accessed in the second group of registers in response to the tag value matching the identifier value.

19 Claims, 5 Drawing Sheets

OTHER PUBLICATIONS

Intel Corporation, "IA-32 Intel® Architecture Software Developer's Manual, vol. 2: Instruction Set Reference," pp. 29-31 (Chapter 2.1: General Instruction Format, Chapter 2.4: ModR/M and SIB Bytes), Document No. 245471.012, 2003 (4 pages).

State Intellectual Property Office of China, first Office action issued on Jun. 9, 2006, in connection with counterpart Chinese application No. 03154427.4 (6 pages).

* cited by examiner

EXTENDED REGISTER SPACE APPARATUS AND METHODS FOR PROCESSORS

RELATED APPLICATIONS

This application is a continuation of prior application Ser. No. 10/238,276, filed Sep. 10, 2002, now abandoned and which is hereby incorporated by reference herein in its entirety.

FIELD OF THE DISCLOSURE

The present disclosure relates generally to microprocessors and, more particularly, to apparatus and methods that extend the register space available to a processor without requiring modification of the instruction set encodings associated with that processor.

BACKGROUND

The architectural register set or register space of a processor is typically physically integrated within the processor (i.e., is on-chip). Register space or registers may be used to facilitate the rapid execution of instructions and manipulation of operand values by a processor. As is well known, the registers making up a register space are not a shared resource and, as a result, can be accessed more rapidly than other resources that are physically external or separate from the processor chip (i.e., off-chip) and/or which are shared with other agent resources. The register space of a processor is not subject to memory coherency schemes (such as those that are used within multiprocessor systems) and other operational overhead associated with the management of shared memory resources. Also, using a memory stack in lieu of a larger register file introduces additional overhead associated with address calculations.

Some microprocessors or processors provide a relatively limited register space or architectural register set. For example, the thirty-two bit Intel processor families, which are collectively referred to as IA-32 processors, provide eight thirty-two bit general purpose registers, which are located on-chip. Unfortunately, many compiler optimizations, which are usually used to increase the effective instruction-per-clock-cycle (IPC) rate of processors, typically require more than eight general purpose registers. Additionally, a larger number of registers is generally beneficial because a larger number of registers enables program execution to be carried out using fewer memory-based operations, thereby reducing the overhead associated with accessing stack-based operands and, thus, reducing cache occupation and bandwidth (i.e., cache ports) overhead. Reducing the number of stack-based memory operations performed by a processor can free a substantial amount of cache space and bandwidth for use by other load, store and prefetch instructions, which can substantially increase the IPC rate of the processor.

While it is a relatively simple matter to redesign a processor to have a larger register space, such a processor redesign typically requires changes to the instruction set encodings to enable the redesigned processor to efficiently use the additional register space. Furthermore, instruction set encoding changes are typically not backward compatible with earlier versions of the processor that have a smaller register space.

DESCRIPTION OF THE PREFERRED EXAMPLES

Figure 1:
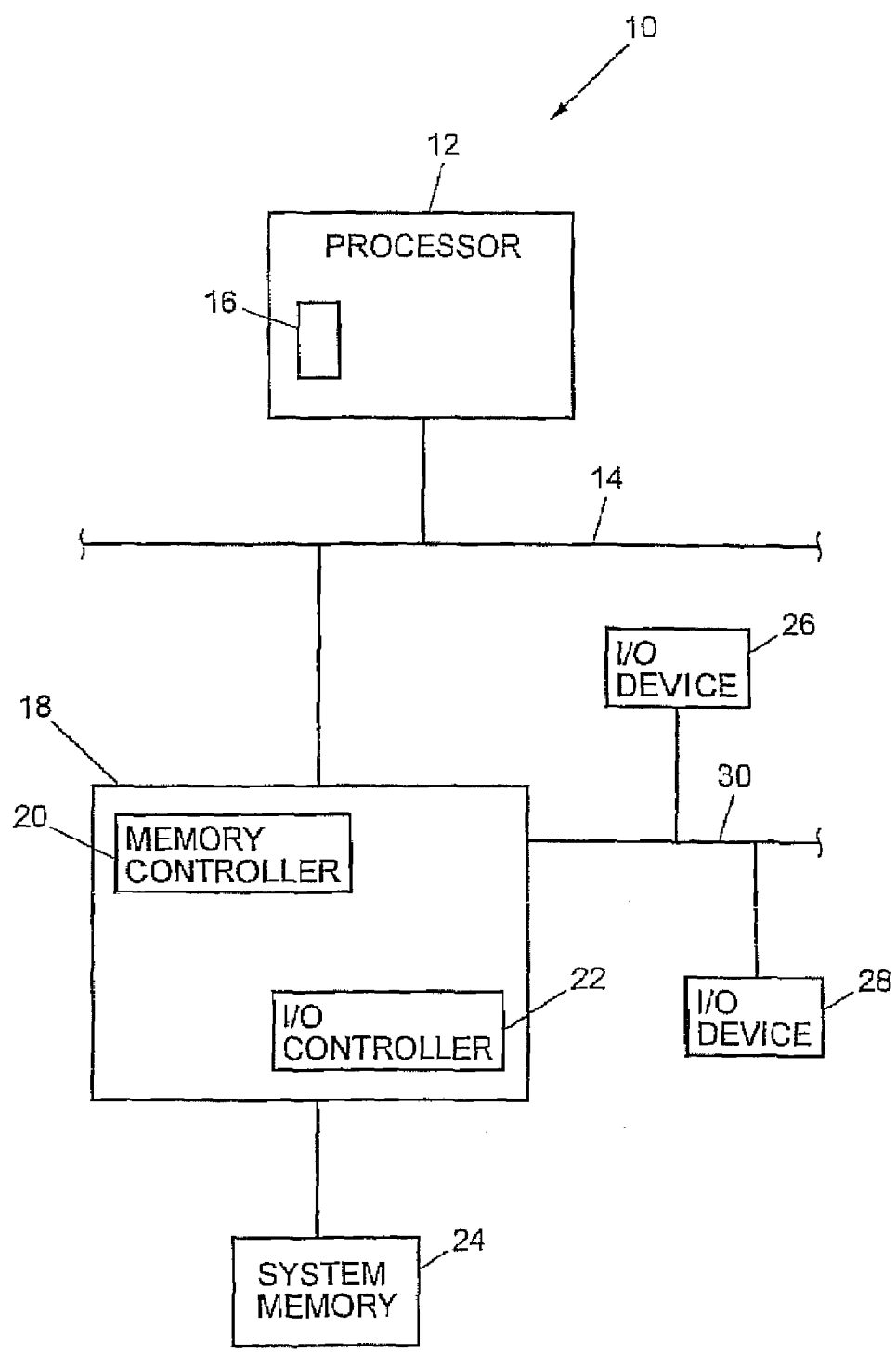
FIG. 1 is a block diagram of an example processor system that uses the extended register space apparatus and methods described herein.

FIG. 1 is a block diagram of an example processor system 10 that uses the extended register space apparatus and methods described herein. As shown in FIG. 1, the processor system 10 includes a processor 12 that is coupled to an interconnection bus or network 14. The processor 12 includes an architectural register set or register space 16, which is depicted in FIG. 1 as being entirely on-chip, but which could alternatively be located entirely or partially off-chip and directly coupled to the processor 12 via dedicated electrical connections and/or via the interconnection network or bus 14. The processor 12 may be any suitable processor, processing unit or microprocessor such as, for example, an Intel Itanium™ processor, Intel X-Scale™ processor, Intel Pentium™ processor, etc. However, in the example described in detail below, the processor 12 is a thirty-two bit Intel processor, which is commonly referred to as an IA-32 processor.

In the example shown in FIG. 1, regardless of whether the register space 16 is implemented on-chip, off-chip, or some combination of on-chip and off-chip, the register space 16 is extended to provide more than eight thirty-two bit general purpose registers, which are currently provided by existing IA-32 processors. Although not shown in FIG. 1, the system 10 may be a multi-processor system and, thus, may include one or more additional processors that are identical or similar to the processor 12 and which are coupled to the interconnection bus or network 14.

The processor 12 of FIG. 1 is coupled to a chipset 18, which includes a memory controller 20 and an input/output (I/O) controller 22. As is well known, a chipset typically provides I/O and memory management functions as well as a plurality of general purpose and/or special purpose registers, timers, etc. that are accessible or used by one or more processors coupled to the chipset. The memory controller 20 performs functions that enable the processor 12 (or processors if there are multiple processors) to access a system memory 24, which may include any desired type of volatile memory such as, for example, static random access memory (SRAM), dynamic random access memory (DRAM), etc. The I/O controller 22 performs functions that enable the processor 12 to communicate with peripheral input/output (I/O) devices 26 and 28 via an I/O bus 30. The I/O devices 26 and 28 may be any desired type of I/O device such as, for example, a keyboard, a video display or monitor, a mouse, etc. While the memory controller 20 and the I/O controller 22 are depicted in FIG. 1 as separate functional blocks within the chipset 18, the functions performed by these blocks may be integrated within a single semiconductor circuit or may be implemented using two or more separate integrated circuits.

Figure 2:
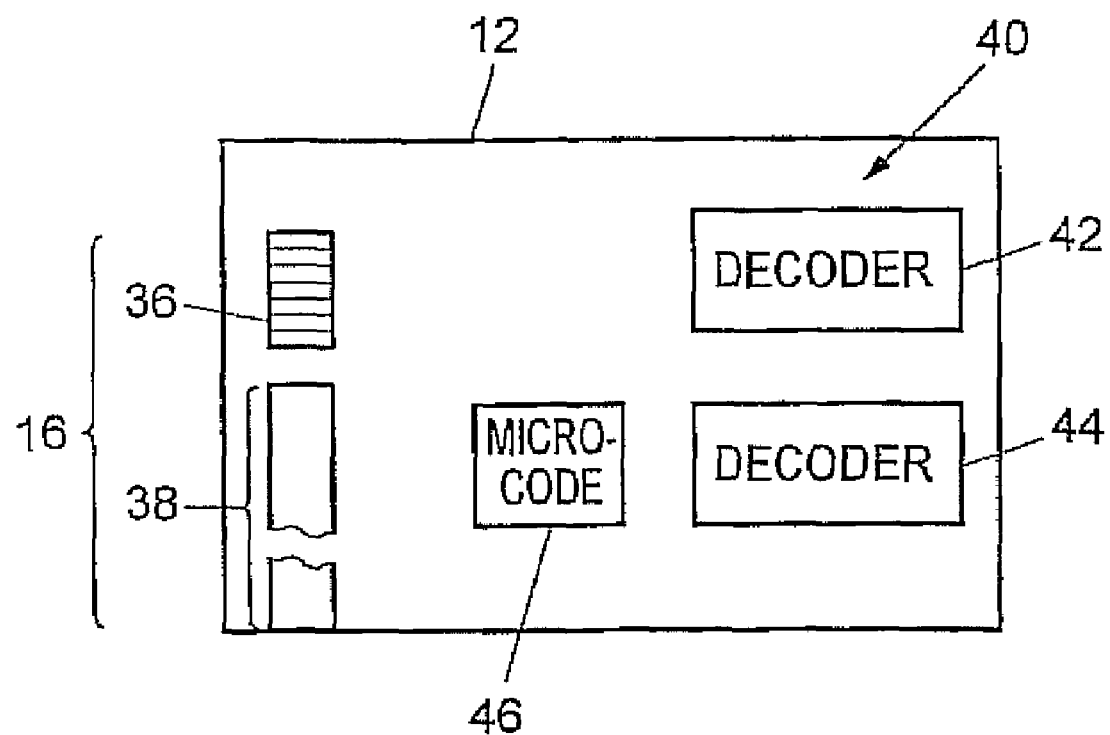
FIG. 2 is a more detailed block diagram of the processor shown in FIG. 1.

FIG. 2 is a more detailed block diagram of the processor 12 shown in FIG. 1. In the example of FIG. 2, the register space 16 of the processor 12 includes eight on-chip general purpose registers 36 that are currently provided by existing IA-32 processors and an extended on-chip register space or set of registers 38. In addition, the processor 12 includes instruction processing hardware and/or logic 40 which, in addition to the pipeline hardware provided with known IA-32 processors, includes two decoding blocks 42 and 44 that are adapted to process or decode instructions or portions of an instruction in parallel. Still further, the processor 12 includes microcode 46 that, in addition to enabling the processor 12 to carry out the functions of a known IA-32 processor, enables the processor 12 to utilize the extended register space 38 for carrying out existing IA-32 instruction set encodings.

Figure 3:
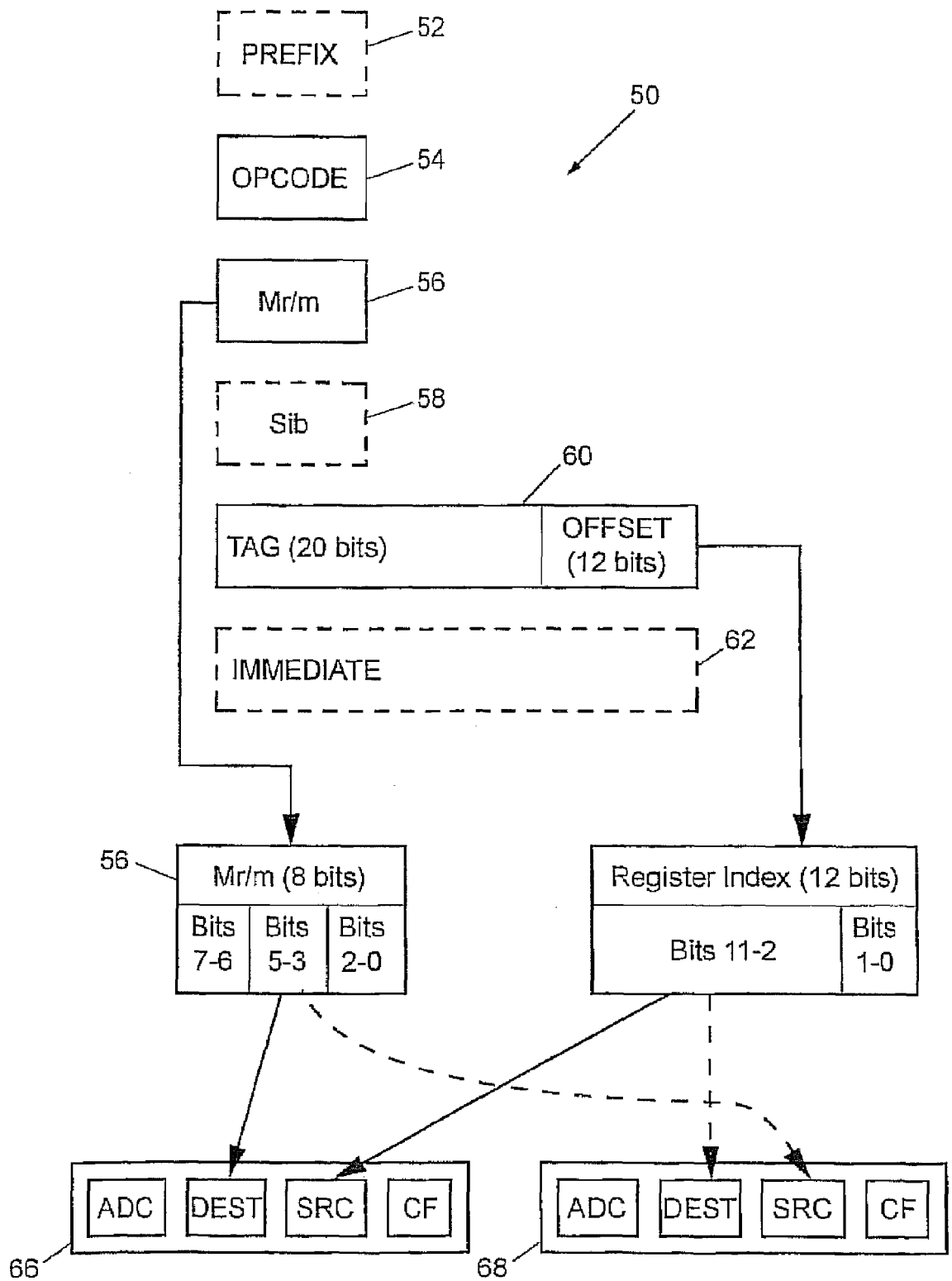
FIG. 3 is a block diagram that depicts an example manner in which an instruction encoding can be used by the processor shown in FIGS. 1 and 2 to access an extended register space.

FIG. 3 is a block diagram that depicts an example manner in which an existing or standard IA-32 instruction encoding can be used by the processor 12 of FIGS. 1 and 2 to access the extended register space 38. As shown in FIG. 3, the encoding fields 50 of a standard instruction for an IA-32 processor include an optional prefix field 52, an opcode field 54, an Mr/m field 56, an Sib field 58, a displacement addressing field 60, and an immediate addressing field 62. Because the IA-32 processor instruction encoding fields 50 shown in FIG. 3 are well known, additional detailed description of these fields is not required. However, for purposes of facilitating an understanding of the examples described herein, some additional description of the purpose and operation of these fields is provided below.

The opcode field 54 contains the binary encoding, which in this example is one-byte or eight bits of encoding, required to carry out a particular processor operation such as, for example, an arithmetic operation, a memory access operation, a register contents manipulation (e.g., shift), or any combination of these operations. The Mr/m field 56, among other things, is a one-byte field that determines the addressing mode to be used in carrying out an instruction (e.g., execution of an instruction by a processor such as the processor 12 shown in FIG. 1). For example, a displacement addressing mode or an immediate addressing mode may be used depending on the status of the bits within the Mr/m field 56. As is known, a displacement addressing mode uses the contents of the displacement field 60 to address an operand associated with an instruction relative to another memory address such as, for example, the starting address of the instruction. On the other hand, an immediate addressing mode uses the immediate addressing field 62 to address an operand associated with the instruction based on the contents of the immediate addressing field 62. In other words, if used, the immediate addressing field 62 typically contains an absolute (as opposed to a relative) memory address, which is associated with an operand of the instruction.

The example instruction described in connection with FIG. 3 is an add with carry instruction, which is represented mnemonically as ADC. As is known, the ADC instruction for an IA-32 processor requires two operands, one of which is referred to as a source (SRC) operand and the other of which is referred to as a destination (DEST) operand. With existing IA-32 processors, one of the two operands (i.e., SRC or DEST) must be located within an on-chip register and the other one of the operands may be located within system memory. When executed by an existing IA-32 processor, the ADC instruction results in the summation of the contents of the SRC, the DEST and the carry flag (CF) and storage of the sum in the location associated with the DEST operand. Mnemonically, this operation can be represented as DEST<=DEST+SRC+CF. Thus, the DEST location functions as both an operand and a storage location for the result of the instruction. For processor architectures that allow more than one memory operand, the methods described herein can be individually applied to each memory operand.

When executing an ADC instruction, existing or known IA-32 processors interpret bits three to five of the Mr/m field 56 as an address for one of the eight known or traditional general purpose on-chip registers (e.g., registers zero to seven). Depending on the particular encodings used for the ADC instruction, the register address represented in the Mr/m field 56 may be either the location of the SRC operand or the DEST operand. In the example depicted in connection with reference numeral 66, the on-chip register is the DEST operand and existing IA-32 processors use the displacement field 60 to address a portion of system memory (e.g., a portion of the memory 24 shown in FIG. 1) for the SRC operand. On the other hand, in the example depicted in connection with reference numeral 68, the on-chip register is the SRC operand and existing IA-32 processors use the displacement field 60 to address system memory for the DEST operand.

For the example IA-32 processor of FIG. 2, the register space 16 (FIG. 1) is extended and, thus, contains more than the eight traditional general purpose registers currently provided with IA-32 processors. In the example of FIG. 2, the register space 16 is extended to contain an additional 1024 thirty-two bit registers. However, any other number of additional registers may be used instead. As described in greater detail in connection with FIG. 4 below, the apparatus and methods described herein enable the instruction encoding fields 50 shown in FIG. 3 to access the register space 16 of the processor 12. In particular, when executing an ADC instruction in a displacement addressing mode as depicted in FIG. 3, the processor 12 reads the most significant (i.e., the upper) twenty bits of the displacement field 60 as a page identifier or tag and then compares this page identifier or tag to a predetermined identifier value associated with the extended register space 38. As described in detail in connection with FIG. 4 below, if the page identifier or tag read from the displacement field 60 matches the identifier value associated with the extended register space 38, the processor 12 processes the instruction by using the lower twelve bits of the displacement field 60 to access one of the two operands of the instruction within the extended register space 38.

As depicted in FIG. 3, the lower twelve bits or offset of the displacement field 60 are used as a register index to the extended register space 38. Specifically, bits two to eleven are used to address the 1024 thirty-two bit registers. The lowest two bits (i.e., zero and one) are ignored because these bits correspond to (i.e., may be used to individually address or select) the four bytes making up each thirty-two bit register word. Thus, if bits three to five of the Mr/m field 56 address the SRC operand, then bits two to eleven of the displacement field 60 are used by the processor 12 to address the DEST operand within the extended register space 38. On the other hand, if bits three to five of the Mr/m field 56 address the DEST operand, then bits two to eleven of the displacement field 60 are used by the processor 12 to address the SRC operand within the extended register space 38.

Although the example described in connection with FIG. 3 uses a single page identifier or tag that corresponds to a four kilobyte page or 1024 thirty-two bit words within the memory map of the processor 12, additional page identifiers or tags could be used to enable the processor 12 to access more than 1024 thirty-two bit registers within the extended register space 38. Likewise, fewer than 1024 thirty-two bit registers may be provided within the extended register space 38, in which case some of the register addresses provided by the lower twelve bits of the displacement field 60 may be unused or ignored. Alternatively, a tag having more than twenty bits may be used to access registers within the extended register space 38. In that case, the offset or register index portion of the displacement field 60 would have fewer than twelve bits and, thus, would enable addressing and access to fewer than 1024 thirty-two bit registers. Additionally, although the example depicted in FIG. 3 is based on an add with carry instruction any other instruction using memory operands could be used instead. Still further, while the example depicted in FIG. 3 is based on using an instruction set for an IA-32 processor, other instruction sets associated with other processor types could be used instead. In particular, for implementations based on these other instruction sets and processor types, the fields associated with the native register address and memory address would be used instead of the IA-32 fields "Mr/m" and "displacement."

In the example described in connection with FIGS. 1-3, the processor 12 is an IA-32 processor and the register space 16 includes the eight general purpose on-chip registers that are traditionally provided by known IA-32 processors and an additional 1024 thirty-two bit on-chip registers, which have not previously been provided with IA-32 processors. To enable the processor 12 to access the extended register space 38 using instruction encodings compatible with existing IA-32 processors (i.e., processors which do not have the extended register space 38), the processor 12 includes microarchitecture (e.g., microcode) for causing the processor 12 to carry out the instruction processing technique described in detail in connection with FIG. 4 below. In addition, the operating system (OS) and/or basic input/output system (BIOS) of the computer system 10 is configured so that the memory map of the system 10 reserves the memory page associated with the extended register space 38 for exclusive use by the processor 12. In other words, the memory page identifier that would normally be used by existing IA-32 processors to address a physical page of memory within the system memory 24 is instead used exclusively by the processor 12 (i.e., is not shared by other resources within the system 10) to address registers within the extended register space 38.

Figure 4:
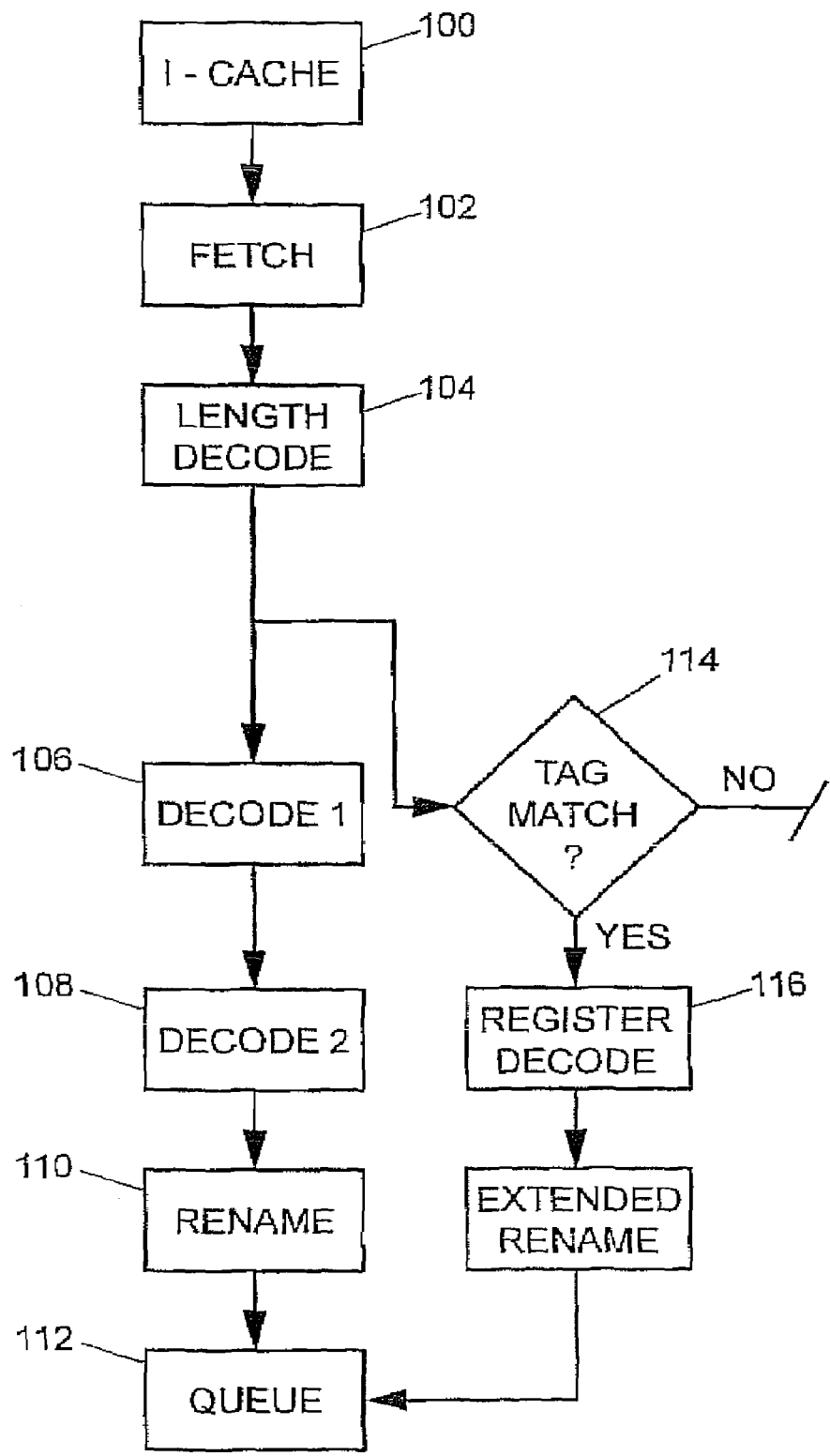
FIG. 4 is a flow diagram that depicts an example manner in which the processor shown in FIGS. 1 and 2 can process an instruction encoding to access an extended register space.

FIG. 4 is a flow diagram that depicts an example manner in which the processor 12 shown in FIGS. 1 and 2 can process existing or standard IA-32 instruction encodings to access the extended register space 38. In particular, the flow diagram shown in FIG. 4 depicts an example manner in which the front-end instruction processing pipeline within the instruction processing hardware or logic 40 of the processor 12 is configured to operate when processing a standard IA-32 instruction encoding such as, for example, the instruction depicted in FIG. 3. As shown in FIG. 4, the processor 12 accesses the cache (block 100), fetches the next instruction to be processed (block 102) and decodes the length of the instruction to be processed (block 104). As is known, decoding the length of an instruction enables a processor to parse the instruction into its component encoding fields (i.e., opcode field, Mr/m field, displacement field, etc.). The instruction to be processed by the processor 12 is then decoded (blocks 106 and 108), renamed (block 110) and then queued for execution (block 112). It should be recognized that the activities associated with blocks 100-112 of FIG. 4 are currently employed by existing IA-32 processors and, thus, are well known and are not described in greater detail herein.

The processor 12 is adapted to perform additional activities in parallel to the instruction processing activities associated with blocks 100-112 described in connection with FIG. 4. The processor 12 uses the decoding blocks 42 and 44 to carry out the decoding activities associated with blocks 106 and 108. In addition, the decoding blocks 42 and 44 are used to determine whether the page identifier or tag portion of the displacement field 60 matches an identifier value or tag associated with the extended register space 38 of the processor 12 (block 114). If the tag portion of the displacement field 60 does not match the tag associated with the extended register space 38 of the processor 12, then the decoding hardware or logic performing parallel decoding (i.e., in parallel to blocks 106 and 108) of the instruction currently being processed takes no further action in connection with the instruction. On the other hand, if the page identifier or tag portion of the displacement field 60 does match the tag associated with the extended register space 38, then the processor 12 uses one of the decoders 42 and 44 to decode (block 116) the register pointer bits (i.e., bits three to five) of the Mr/m field 56 and the register index bits (i.e., the lower twelve bits) of the displacement field 60 to determine whether the SRC operand or DEST operand is located within the extended register space 38 and, thus, is to be addressed by the register index portion of the displacement field 60.

As can been seen from the example in FIG. 4, the number of clock cycles required to decode an instruction that utilizes the extended register space 38 can be minimized by providing additional decoding hardware and/or logic that performs register decoding operations (e.g., block 116) in parallel to instruction decoding activities (e.g., blocks 106 and 108). For example, with the example processor 12 shown in FIG. 2, one of the decoders 42 and 44 can be used for register decoding operations while the other one of the decoders 42 and 44 is used for instruction decoding activities. However, the addressing mode used by the instruction affects the extent to which instruction decoding and register decoding operations can be performed in parallel. For instance, for the example instruction shown and described in connection with FIG. 3, displacement addressing is used. With displacement addressing, an operand address is directly encoded within the instruction (i.e., within the displacement field 60 and/or the Mr/m field 56), thereby enabling substantial parallel processing of the encoding fields within the instruction.

In the case where the page identifier or tag portion of the displacement field 60 is contained within a register (i.e., the tag value is stored in the register) such as, for example, addressing that uses indirection through a base register, the technique shown in FIG. 4 may be used to compare (block 114) the value stored in the base register to the tag or value associated with the extended register space 38. However, such a comparison may be speculative because the comparison is performed at the front-end of the instruction processing pipeline and a subsequent processor operation could change the value stored in the base register. Thus, with indirect or other more complex addressing modes, the processor 12 is preferably configured to track changes to the base register and, upon recognition of changes to the base register value, restart any instruction affected by the change. In any event, changes to the page identifier or tag portion (i.e., the upper twenty bits) of the base register are a relatively rare occurrence and, thus, instruction restarts and the like would have a minimal impact on overall execution speed or the effective IPC rate of the processor 12.

From the above example, it can be seen that a standard or known IA-32 instruction set or encodings can be used to enable an IA-32 processor having an extended register space (e.g., the extended register space 38 of the processor 12) to use that extended register space to store operand values that would traditionally be stored within system memory (e.g., within off-chip shared memory). The use of register-based operations in place of operations that would otherwise be memory-based reduces the use of stack-based operations and other memory access overhead, thereby resulting in an increased IPC rate for the processor having the extended register space.

Software written for a processor having an extended register set such as the example processor described in connection with FIGS. 1-4 above is backward compatible with (i.e., can run natively on or can be executed by) an existing IA-32 processor having only the eight traditional on-chip general purpose registers. To enable such backward compatibility, software or instructions utilizing the extended register set are compiled so that an instruction requiring access to a register within the extended register set is reduced to a memory access operation. However, the BIOS and/or OS executed by the existing IA-32 processor must ensure that the system memory used as register space is available to the existing IA-32 processor. In other words, if software is written for use by an IA-32 processor having an additional 1024 thirty-two bit on-chip registers, executing this software on a currently available IA-32 processor having only eight on-chip general purpose registers requires the BIOS and/or OS of the existing IA-32 processor to map a page (i.e., 1024 thirty-two bit words) with the same base address as the extended register tag within its system memory. However, executing software that makes use of the extended register space 38 on an existing IA-32 processor does not provide a performance advantage (e.g., an increased IPC rate) because operands addressed within the extended register space physically reside within system memory and, thus, accessing these operands involves memory operations and the processing overhead associated therewith.

As noted above, the extended register space 38 provided within the processor 12 can be more or less than 1024 thirty-two bit words (e.g., more than one page) if desired. For example, in a case where the processor 12 is executing a single thread or process that uses multiple pages of register space within the extended register space 38, the tag match or comparison (block 114) shown in FIG. 4 compares the tag portion of the displacement field 60 of each instruction executed in the thread to identifier values or tags that correspond to the multiple pages of register space. If any one of the identifiers or tags matches the tag portion of the displacement field 60, the processor 12 carries out the register decoding (block 116) as described in connection with FIG. 4 above.

On the other hand, in a case where the processor 12 uses its operating system to carry out multiple threads or processes, each thread or process can be associated with a different page identifier or tag so that each thread or process has its own page of register space. Thus, in the case where the processor 12 is executing multiple threads or processes, each of which is associated with a different page identifier or tag, the tag match or comparison (block 114) shown in FIG. 4 compares the tag portion of the displacement field 60 to the identifier associated with the page used for the current thread or process.

Still further, the processor 12 may execute multiple threads or processes where some or all of those threads or processes use a plurality of pages within the extended register space 38. In other words, there may be multiple threads and each of those threads may have access to more than one page within the extended register space 38. In this case, the tag match or comparison (block 114) compares the tag portion of the displacement field 60 to the identifier values or tags associated with the current thread.

For single- or multi-threaded processors (i.e., processors that execute multiple processes simultaneously) that have the extended register space 38, the operating system is preferably adapted to save and restore the extended register space 38 for each thread or process in response to a context switch (i.e., when switching from execution of one process or thread to another process or thread). Additionally, an efficient transfer of operands between the eight traditional on-chip general purpose registers and the extended register space 38 can be implemented by mapping the traditional registers into the extended register space 38. Alternatively, the eight traditional registers associated with known IA-32 processors may be kept physically and logically separate from the extended register space 38 and specific encodings of the Mr/m field 56 can be used to indicate that a source or destination operand is located in one of the eight traditional on-chip registers.

Further optimization of the use of the extended register space 38 can be achieved with processors having trace cache-based microarchitectures. In particular, when a processor having a trace cache-based microarchitecture identifies an instruction that requires access to the extended register space 38, information relating to that instruction and the extended register space to which it requires access can be stored in the microcode trace to enable more efficient processing of that instruction during subsequent invocations of the instruction.

Figure 5:
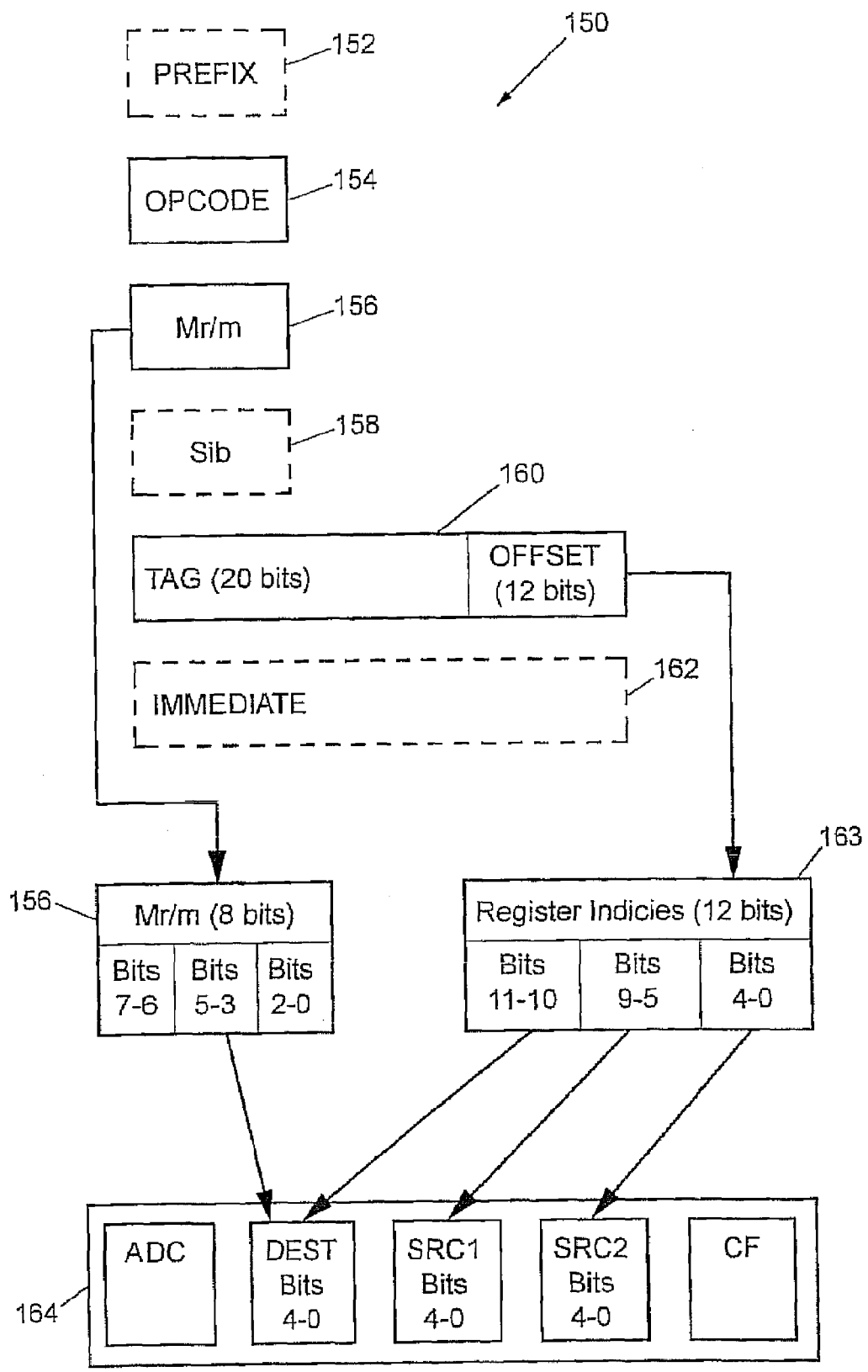
FIG. 5 is a block diagram that depicts another example manner in which an instruction encoding can be used by the processor shown in FIGS. 1 and 2 to access an extended register space.

FIG. 5 is a block diagram that depicts another example manner in which instruction encoding fields 150 of a standard IA-32 instruction can be used by the processor 12 shown in FIG. 1 to access the extended register space 38. As shown in FIG. 5, the example instruction is composed using standard IA-32 processor instruction encoding fields (i.e., the encoding fields that are used with IA-32 processors having only eight on-chip general purpose registers). As with the instruction shown in FIG. 3, the example encoding fields 150 include a prefix field 152, an opcode field 154, an Mr/m byte or field 156, an Sib field 158, a displacement addressing field 160 and an immediate addressing field 162.

As depicted in FIG. 5, bits three to five of the Mr/m field 156 and an offset portion (i.e., bits zero to eleven) 163 of the displacement field 160 are used by the processor 12 to access three operands within three different registers. In the example shown in FIG. 5, bits within the Mr/m field 156 and the offset portion 163 of the displacement field 160 are decoded as a three operand add with carry (ADC) instruction 164. However, the principals depicted in FIG. 5 could be applied to any other instruction. Mnemonically, the ADC instruction 164 can be depicted as DEST<=SRC1+SCR2+CF.

To process the instruction shown in FIG. 5, the processor 12 executes the register decode process (block 116 of FIG. 4) so that bits three to five of the Mr/m field 156 and bits ten and eleven of the offset 163 are used to address the destination (DEST) operand, bits five to nine of the offset 163 are used to address the first source operand (SRC1) and bits zero to four of the offset 163 are used to address the second source operand (SRC2). Thus, each of the three operands shown in FIG. 5 is represented by a five-bit value and, as a result, each of the operands can randomly access any one of thirty-two registers located in the extended register space 38 of the processor 12.

The example manner of enabling the processor 12 to access an extended register space depicted in FIG. 5 is similar to the technique depicted in FIG. 4. However, as can be seen from a comparison of FIGS. 3 and 5, the manner in which the bits of the displacement field are decoded enables native backward compatibility of software written using the standard IA-32 encodings on known IA-32 processors.

On the other hand, software written using the standard IA-32 instruction encodings for a processor such as that shown in the example of FIG. 5 is not natively backward compatible with known IA-32 processors. However, backward compatibility can be achieved by using a modified exception handler. In particular, because the tag field of the pseudo memory displacement points to an unmapped memory address, the fault handler can be used to inspect an instruction that is attempting to access this unmapped memory, and emulate the functionality of the instruction. Upon completion, the fault handler returns program execution to the instruction following the emulated instruction. Of course, a substantial performance penalty is incurred as a result of using a fault handler to emulate each software instruction that attempts to access the extended register space within a processor that does not have the extended register space.

Although certain methods and apparatus implemented in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method comprising:
   decoding a first instruction indicating a first tag value and executed via a first thread associated with a respective first group of extended registers reserved for use in connection with instructions executed via the first thread;
   decoding a second instruction indicating a second tag value and executed via a second thread associated with a respective second group of extended registers reserved for use in connection with instructions executed via the second thread;
   determining whether first information is stored in a first group of registers or the first group of extended registers based on a comparison of the first tag value and a first identifier value indicative of the first group of extended registers;
   accessing the first information in the first group of extended registers in response to the first tag value matching the first identifier value;
   determining whether second information is stored in the first group of registers or the second group of extended registers based on a comparison of the second tag value and a second identifier value corresponding to the second group of extended registers; and
   accessing the second information in the second group of extended registers in response to the second tag value matching the second identifier value.

2. A method as defined in claim 1, wherein the first tag value is a page identifier value.

3. A method as defined in claim 1, wherein the first instruction includes a register index value, and wherein accessing the first information in the first group of extended registers comprises determining a location of a register within the first group of extended registers based on the register index value.

4. A method as defined in claim 3, further comprising retrieving the first tag value and the register index value from an address displacement field of the first instruction.

5. A method as defined in claim 1, wherein the first information is a first operand, wherein the first instruction includes a register identifier indicative of a register in the first group of registers, and further comprising accessing a second operand in the register in the first group of registers based on the register identifier.

6. A method as defined in claim 1, wherein the first group of registers are an on-chip register set located on a processor configured to process the first and second instructions, and wherein the first group of extended registers are an off-chip register set located external to the processor.

7. A method as defined in claim 1, wherein the first group of extended registers corresponds to a memory page configured for exclusive use by a processor configured to process the instruction.

8. A method as defined in claim 1, wherein the first instruction is backward compatible to be executed by a processor configured to access the first information in a memory location instead of the first group of extended registers.

9. A system comprising:
   a first group of registers;
   a first group of extended registers reserved for use in connection with instructions executed via a first thread, the first group of extended registers associated with a first identifier value;
   a second group of extended registers reserved for use in connection with instructions executed via a second thread, the second group of extended registers associated with a second identifier value;
   a memory to store an instruction indicating a tag value; and
   logic to determine whether information to be accessed by the instruction is stored in the first group of registers, the first group of extended registers, or the second group of extended registers based on a comparison of the tag value and the first identifier value if the instruction is executed via the first thread or based on a comparison of the tag value to the second identifier value if the instruction is executed via the second thread.

10. A system as defined in claim 9, wherein the tag value is a page identifier value.

11. A system as defined in claim 9, wherein the logic is further to cause a processor to access the information in the first group of extended registers in response to the tag value matching the first identifier value.

12. A system as defined in claim 11, wherein the instruction includes a register index value, and wherein the decoder is further to determine a location of a register within the first group of extended registers based on the register index value.

13. A system as defined in claim 12, wherein the tag value and the register index value are stored in an address displacement field of the instruction.

14. A processor comprising:
    a first group of registers
    a first page of registers reserved for use in connection with instructions executed via a first thread, the first page of registers associated with a first identifier value;
    a second page of registers reserved for use in connection with instructions executed via a second thread, the second page of registers associated with a second identifier value; and
    first logic to compare a first value associated with an instruction to the first identifier value if the instruction is executed via the first thread or to the second identifier value if the instruction is executed via the second thread to determine whether a first operand associated with the instruction is stored in a register of the first page of registers or the second page of registers.

15. A processor as defined in claim 14, further comprising second logic to select the register in the first page of registers based on a register index value associated with the instruction in response to the first value matching the first identifier value indicative of the first page of registers.

16. A processor as defined in claim 14, further comprising second logic to retrieve a second operand from another register in the first group of registers based on a third value in an addressing mode field associated with the instruction.

17. A processor as defined in claim 14, further comprising second logic to retrieve first and second register indices from a displacement addressing field associated with the instruction in response to the first value matching the first identifier value indicative of the first page of registers, wherein the first register index is indicative of the register and the second register index is indicative of another register in the first page of registers.

18. A processor as defined in claim 17, wherein the second logic is further to retrieve the first operand and a second operand from the first page of registers based on the first and second register indices, and wherein the first and second operands are source operands.

19. A processor as defined in claim 14, wherein the first value is a page identifier.

* * * * *